United States Patent [19]
Chen

[11] Patent Number: 5,804,747
[45] Date of Patent: Sep. 8, 1998

[54] MUSICAL INSTRUMENT HOLDER

[76] Inventor: Chang-Hui Chen, 3 Fl., No. 175, Sec. 2, An-Ho Rd., Taipei, Taiwan

[21] Appl. No.: 979,553

[22] Filed: Nov. 26, 1997

[51] Int. Cl.⁶ .............................. G10D 13/02; G10G 5/00
[52] U.S. Cl. ................................ 84/327; 84/421; 84/453; 248/443
[58] Field of Search ............................ 84/327, 421, 453; 224/910; 248/443

[56] References Cited

U.S. PATENT DOCUMENTS 4,453,446  6/1984  Hoshino .................................. 84/421

Primary Examiner—Stanley J. Witkowski
Attorney, Agent, or Firm—Bacon & Thomas

[57] ABSTRACT

An instrument holder including a horizontal mount at a top of a vertical shaft, the horizontal mount having a threaded upright rod and a radially toothed annular block around the threaded upright rod, a swivel holder turned horizontally about the threaded upright rod and supported on a compression spring and adapted to holding a musical instrument, and a wing nut screwed up with the threaded upright rod to fix the swivel holder at the desired angle.

3 Claims, 6 Drawing Sheets

MUSICAL INSTRUMENT HOLDER

BACKGROUND OF THE INVENTION

The present invention relates to a musical instrument holder for supporting musical instrument, and more particularly to such a musical instrument holder that can be horizontally adjusted to the desired angle.

FIG. 1 shows a prior art tom-tom holder which comprises a vertical shaft for mounting on a base drum, a holder frame at the top of the vertical shaft, two swivel support rod's bilaterally coupled to the holder frame by a respective ball-and-socket joint and adapted to holding the tom-toms, and two tightening-up screws mounted on the holder frame and adapted to fix the swivel support rods in position. The drawback of this structure of tom-tom holder is that the angular positions of the swivel support rods cannot only be adjusted within a limited angle. Therefore, this structure of tom-tom holder cannot be freely adjusted to change the positions of the tom-toms subject the user's body size.

SUMMARY OF THE INVENTION

The present invention has been accomplished to provide an musical instrument holder which eliminates the aforesaid problem. According to the preferred embodiment of the present invention, the instrument holder comprises a vertical shaft having a top horizontal mount, the top horizontal mount comprising a threaded upright rod raised from a top side thereof, a radially toothed annular block raised around the threaded upright rod, and an annular groove defined within the annular block around the threaded upright rod, a compression spring mounted in the annular groove around the threaded upright rod, a swivel holder horizontally turned about the threaded upright rod and supported on the compression spring, the swivel holder comprising a bottom chamber adapted to receive the annular block, a through hole disposed in communication with the bottom chamber and adapted to receive the threaded upright rod, and a radially toothed inside wall portion disposed inside the bottom chamber around the through hole and adapted for engaging the radially threaded top side of the radially threaded annular block, and wing nut threaded onto the threaded upright rod to fix the swivel holder to the annular block at the desired angle.

DETAILED DESCRIPTION OF THE PREFERRED EMBODIMENT

Figure 1:
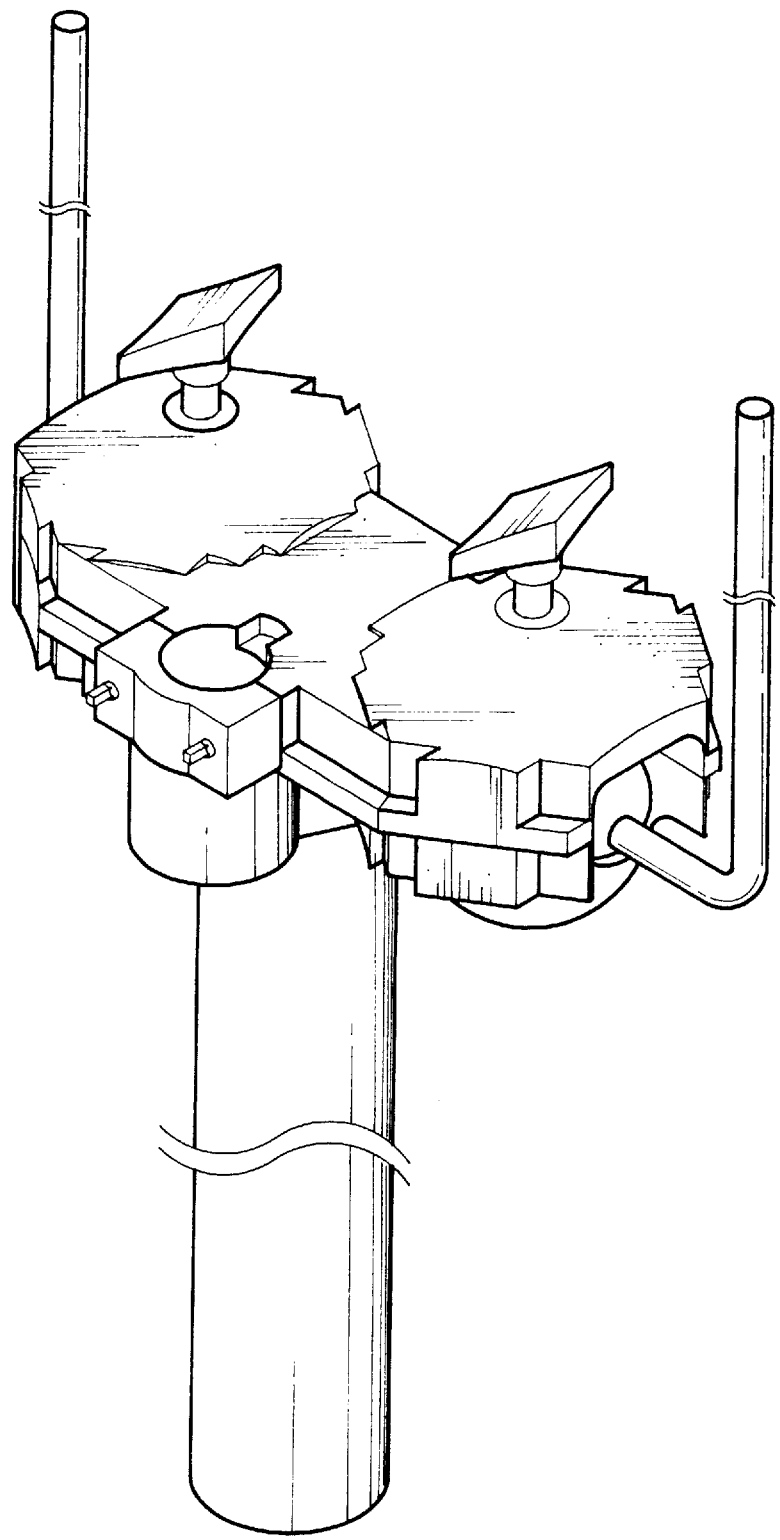
FIG. 1 is an elevational view of a tom-tom holder according to the prior art.
Figure 2:
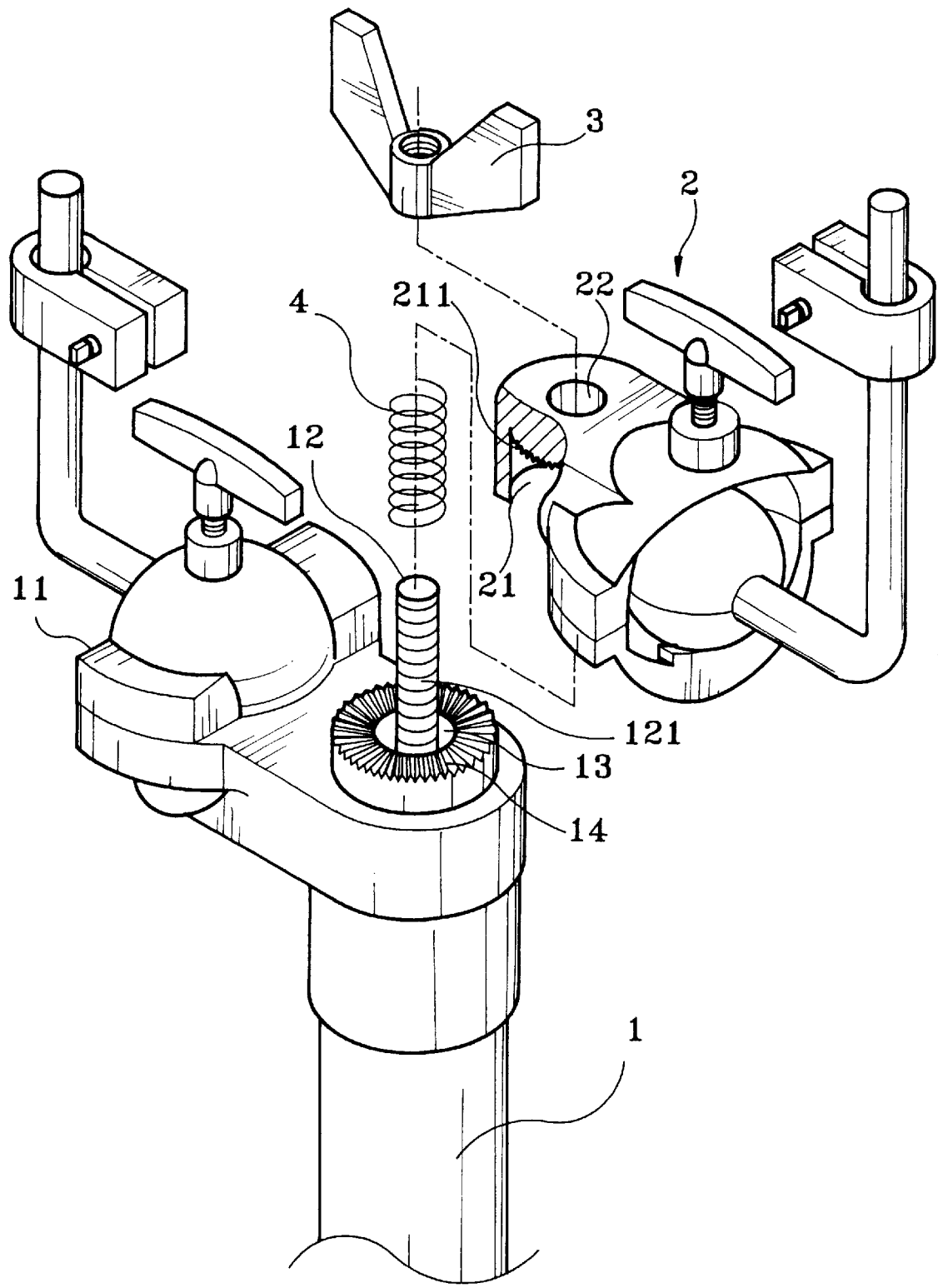
FIG. 2 is an exploded view of a musical instrument holder according to the present invention.

Referring to FIG. 2, a musical instrument holder is shown comprised of a shaft 1, a swivel holder 2, a locking element for example a wing nut 3, and a spring element for example a compression spring 4.

The shaft 1 comprises a top horizontal mount 11. A threaded upright rod 12 is provided at the top horizontal mount 11 at its top side in alignment with the longitudinal central axis of the shaft 1. A radially toothed annular block 14 is raised from the top horizontal mount 11 around the threaded upright rod 12. An annular groove 13 is defined within the radially toothed annular block 14 around the threaded upright rod 12. The compression spring 4 is mounted in the annular groove 13 around the threaded upright rod 12 and partially projecting over the radially toothed top side of the radially toothed annular block 14. The swivel holder 2 is horizontally turned about the threaded upright rod 12, and fixed at the desired angle by the wing nut 3. The swivel holder 2 comprises a bottom chamber 21 adapted to receive the radially toothed annular block 14, a through hole 22 disposed in communication with the bottom chamber 21 and adapted to receive the threaded upright rod 12, and a radially toothed inside wall portion 211 disposed within the bottom chamber 21 around the through hole 22 and adapted for engaging the radially toothed top side of the radially toothed annular block 14. The diameter of the through hole 22 is smaller than the compression spring 4 so that the compression spring 4 can be held within the bottom chamber 21 of the swivel holder 2 when the swivel holder 2 is coupled to the threaded upright rod 12 and the radially toothed annular block 14. The wing nut 3 is threaded onto the threaded upright rod 12 to fix the swivel holder 2 in position.

Figure 3A:
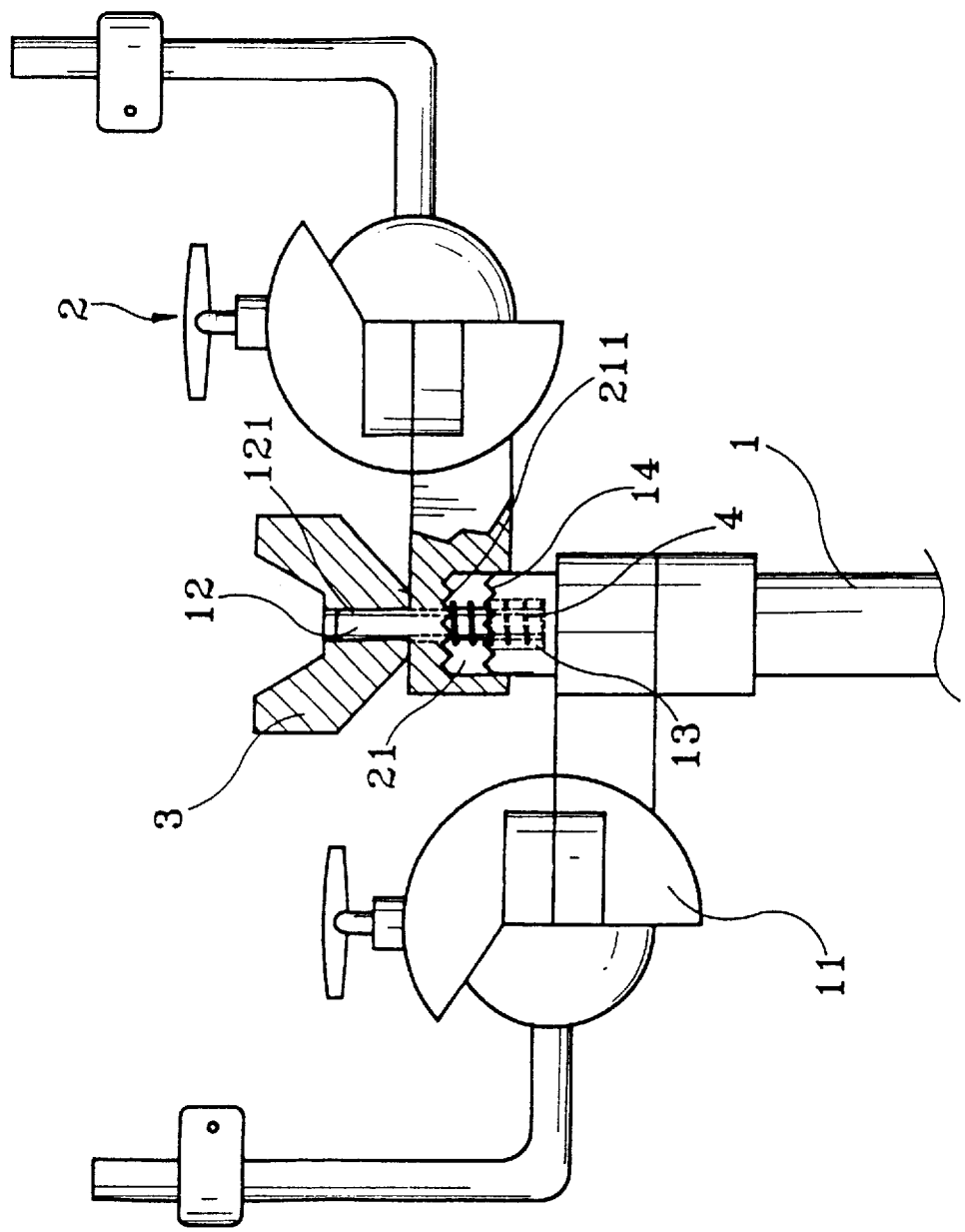
FIG. 3A is a front plain and partially sectional view of the present invention, showing a state of the musical instrument holder where the swivel holder is not locked.
Figure 3B:
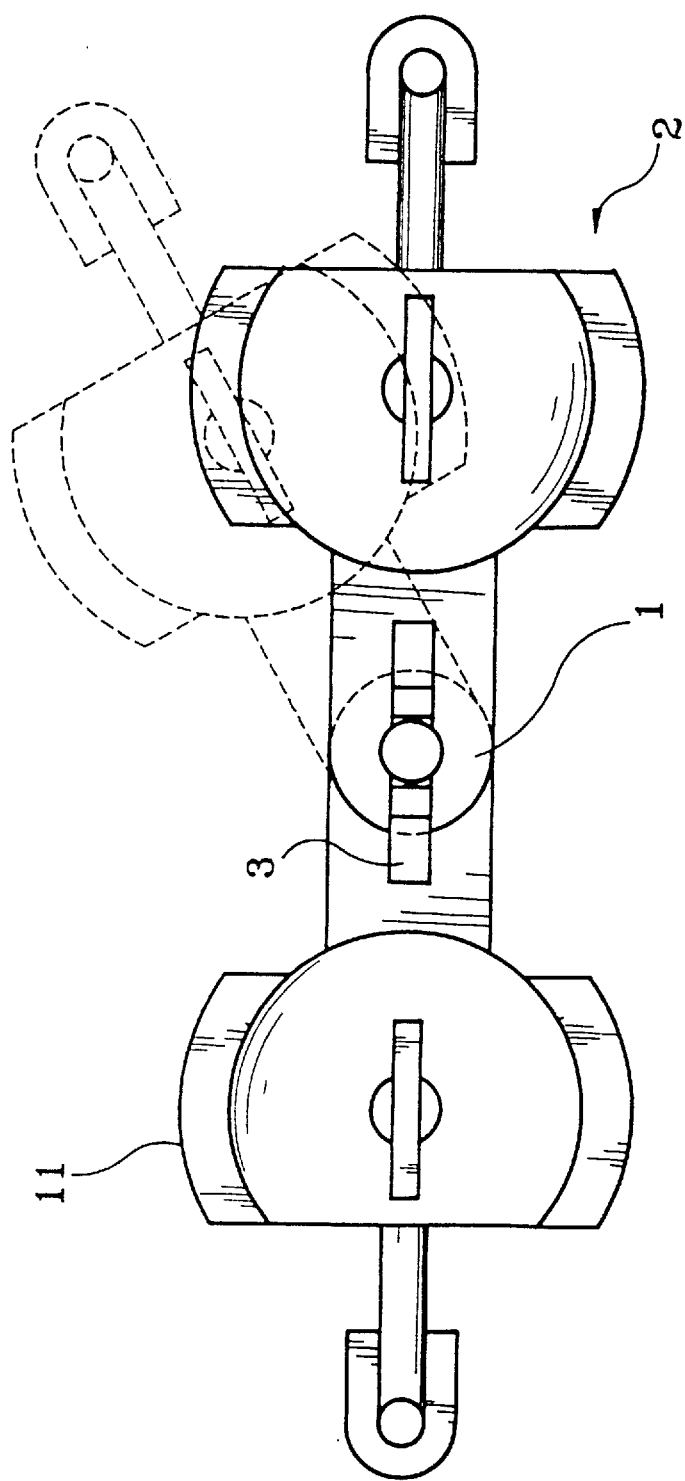
FIG. 3B is a top view showing the swivel holder turned about the threaded upright rod according to the present invention.
Figure 3C:
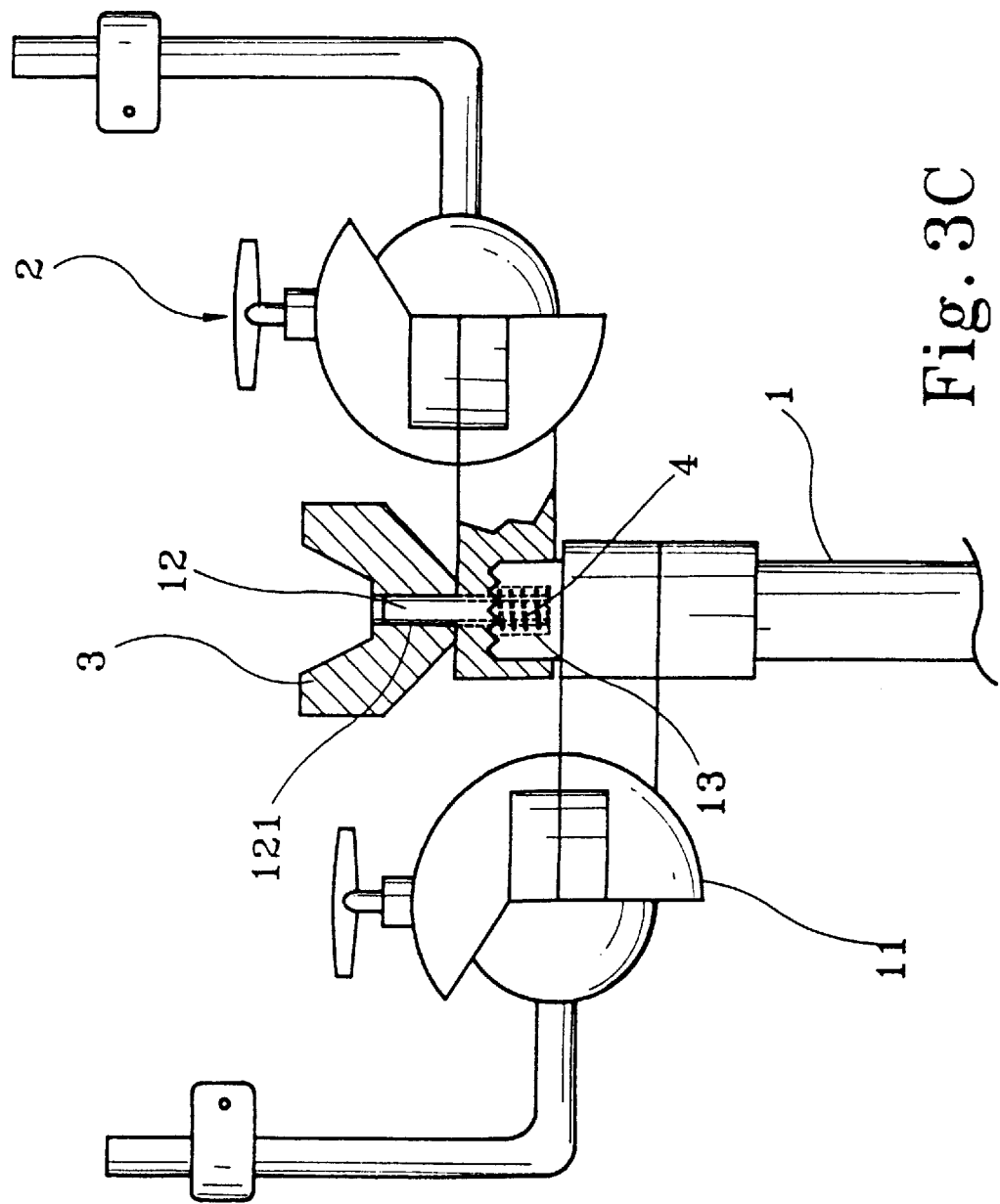
FIG. 3C is similar to FIG. 3A but showing the swivel holder locked.

Referring to FIGS. 3A, 3B and 3C, the swivel holder 2 is coupled to the threaded upright rod 12 and the radially toothed annular block 14 and supported on the compression spring 4, permitting the threaded upright rod 12 to be inserted through the through hole 22 and the radially toothed annular block 14 to be received in the bottom chamber 21, and then the swivel holder 2 is turned about the threaded upright rod 12 to the desired angle and pressed down to force its radially toothed inside wall portion 211 into engagement with the radially toothed top side of the radially toothed annular block 14, and then the wing nut 3 is threaded onto the threaded upright rod 12 and fastened tight to fix the swivel holder 2 at the desired angle.

Figure 4:
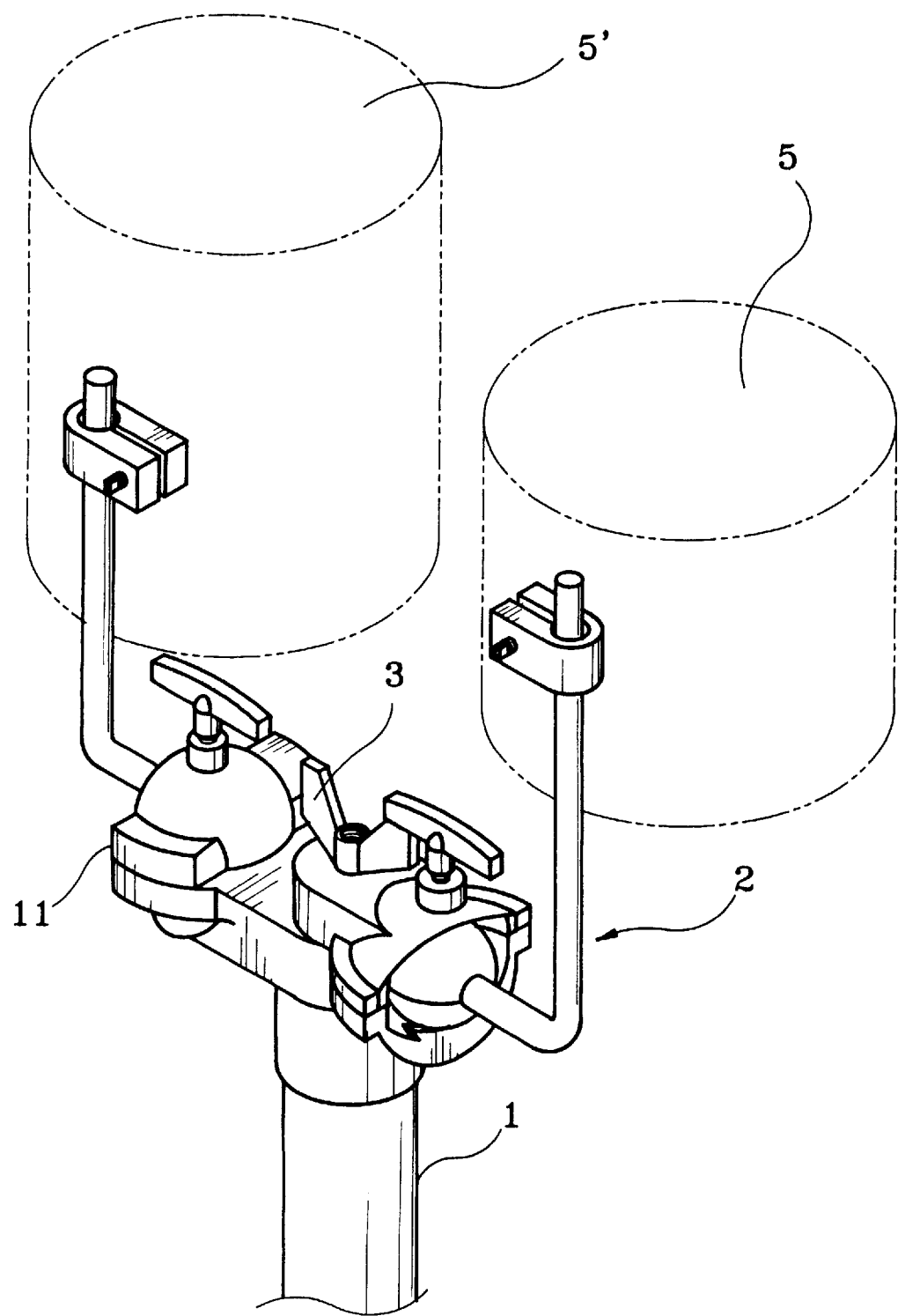
FIG. 4 is an applied view of the present invention, showing two tom-toms supported on the musical instrument holder.

Referring to FIG. 4, two musical instruments (for example, tom-toms) 5;5' are respectively supported on the swivel holder 2 and a fixed auxiliary holder at the top horizontal mount 11. By means of changing the angular position of the swivel holder 2, the position of one musical instrument 5 is adjusted horizontally relative to the other musical instrument 5'.

While only one embodiment of the present invention has been shown and described, it will be understood that various modifications and changes could be made thereunto without departing from the spirit and scope of the invention disclosed.

What is claimed is:

1. An instrument holder comprising:

a vertical shaft having a top horizontal mount, said top horizontal mount comprising a threaded upright rod raised from a top side thereof, an annular block raised around said threaded upright rod, and an annular groove defined within said annular block around said threaded upright rod;

spring means mounted in said annular groove around said threaded upright rod;

a swivel holder horizontally turned about said threaded upright rod and supported on said spring means, said swivel holder comprising a bottom chamber adapted to receive said annular block, and a through hole disposed in communication with said bottom chamber and adapted to receive said threaded upright rod; and a wing nut threaded onto said threaded upright rod above said swivel holder and fastened tight to fix said swivel holder to said annular block at the desired angle.

2. The instrument holder of claim 1, wherein said spring means is a compression spring.

3. The instrument holder of claim 1, wherein said annular block has a radially toothed top wall; said swivel holder comprises a radially toothed inside wall portion disposed within said bottom chamber around said through hole, and adapted for engaging the radially toothed top wall of said annular block.

\* \* \* \* \*